US006650085B2

United States Patent
Lau et al.

(10) Patent No.: US 6,650,085 B2
(45) Date of Patent: Nov. 18, 2003

(54) MODULAR SOLAR BATTERY CHARGER

(75) Inventors: Po K. Lau, Outremont (CA); Sass M. Peress, Montreal (CA)

(73) Assignee: ICP Global Technologies, Inc. (CA)

( * ) Notice: Subject to any disclaimer, the term of this patent is extended or adjusted under 35 U.S.C. 154(b) by 0 days.

(21) Appl. No.: 09/987,936

(22) Filed: Nov. 16, 2001

(65) Prior Publication Data

US 2003/0094921 A1 May 22, 2003

(51) Int. Cl.7 .................................................. H02J 7/00
(52) U.S. Cl. ....................................................... 320/101
(58) Field of Search ......................................... 320/101

(56) References Cited

U.S. PATENT DOCUMENTS

| | | | |
|---|---|---|---|
| 4,786,851 A | 11/1988 | Fuji et al. ......................... 320/2 |
| 4,808,904 A | 2/1989 | Ricaud et al. ................... 320/2 |
| 5,644,207 A | * 7/1997 | Lew et al. ..................... 320/101 |
| 5,701,067 A | * 12/1997 | Kaji et al. ..................... 320/101 |
| D400,163 S | 10/1998 | Lam ........................... D13/107 |
| 5,905,356 A | 5/1999 | Wells ............................. 320/2 |
| D422,964 S | 4/2000 | Lam ........................... D13/107 |
| 6,218,607 B1 | 4/2001 | Mulligan et al. ............ 136/253 |

\* cited by examiner

Primary Examiner—Gregory J. Toatley, Jr.
(74) Attorney, Agent, or Firm—Rothwell, Figg, Ernst & Manbeck

(57) ABSTRACT

A portable modular solar battery charger of the lap top style is disclosed. The module includes two body members hingedly interconnected with each body member having a solar panel attached thereto. A circuit is provided for transferring the energy from the solar panels to a battery charger which, in turn, official charges a battery. The modular unit is interconnectable with additional similar modules by both a physical link and an electrical link.

20 Claims, 3 Drawing Sheets

US 6,650,085 B2

MODULAR SOLAR BATTERY CHARGER

FIELD OF THE INVENTION

The present invention relates to a modular solar battery charger and, more particularly, the present invention relates to a compact module which may be interconnected with similar modules for charging any source of voltaic piles.

BACKGROUND OF THE INVENTION

Solar panel battery charges have been proposed in the art for many years and have evolved into many different forms. Characteristic of these panels is the significant size and weight which limits the effectiveness in certain applications. The larger arrangements are generally employed for charging batteries for use in lighting traffic signs, security lights, etc. These arrangements are often fixedly secured to a standard or other structure and are therefore permanent.

In terms of other more affordable battery charges, the same are often quite large, heavy and therefore cumbersome to handle. One of the other disadvantages associated with the existing arrangements is that the chargers are often delicate and this is particular true of the silicon layers which are integral to the energy transfer process. As such, the structures must often be handled with extreme care in order to avoid damage of the solar cells.

It would be desirable to have a portable charger that did not present size and mass problems and also which could be interconnected or reconfigured to function in a host of environments.

The present invention satiates the needs in this field.

SUMMARY OF THE INVENTION

One object of the present invention is to provide improved modular battery charger.

A further object in one embodiment of the present invention is to provide a modular solar battery charger, comprising:

a first body member and a second body member hingedly connected and moveable from a storage position where each body member is positioned in overlying faced relation to a use position where each body member is in juxtaposed relation;

a solar panel on each body member for generating electricity when exposed to light;

a circuit means for transferring electrical energy from each the panel to a battery; and module interconnection means for interconnecting similar modules in electrical contact.

It has been found that hingedly connected body members afford a user with previously unrealized portability for the solar unit. As will be appreciated by those skilled in the art, any type of battery or voltaic pile which is rechargeable may be recharged by this system. It is also envisioned that the unit can provide power to an apparatus via a passage of energy into a capacitor network. As mentioned herein above, a convenient advantage to this structure is seen in the enhanced durability of the solar panels. As is known, solar panels are typically quite fragile and by providing a strong plastic or other synthetic material body to support the panels, the user can use the panels for applications previously not possible.

The arrangement has been designed to facilitate interconnection of similar modules for applications requiring higher power. As a distinct advantage, since the units are modular, a large number of them can be linked and disassembled which was not possible with the larger and more massive units in the prior art.

Having thus described the invention, reference will now be made to the accompanying drawings illustrating preferred embodiments.

BRIEF DESCRIPTION OF THE DRAWINGS

Similar numerals in the figures denote similar elements.

DETAILED DESCRIPTION OF THE PREFERRED EMBODIMENTS

Figure 1:
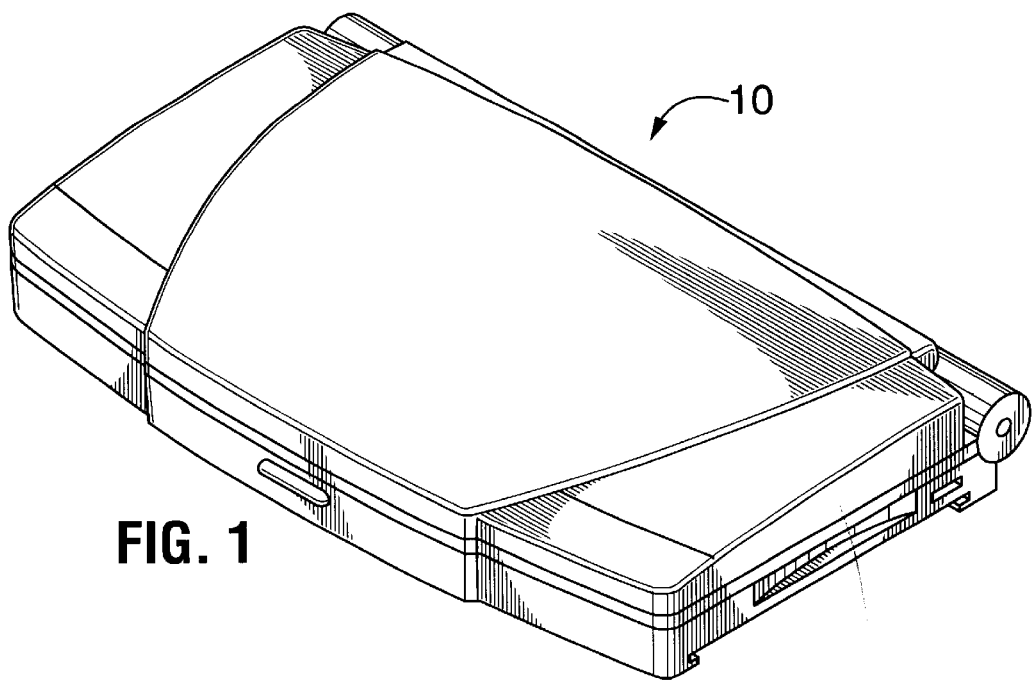
FIG. 1 is a perspective view of one embodiment of the present invention.

Referring now to the drawings, FIG. 1 illustrates the overall structure of the battery charger globally denoted by numeral 10. The arrangement is shown in a closed condition in FIG. 1 and includes a pair of body members 12 and 14 each of which includes a solar cell array 16 and 18, respectively. Each solar cell array 16 and 18 is spaced inwardly from the perimeter of its respective body member 12 or 14.

Figure 4:
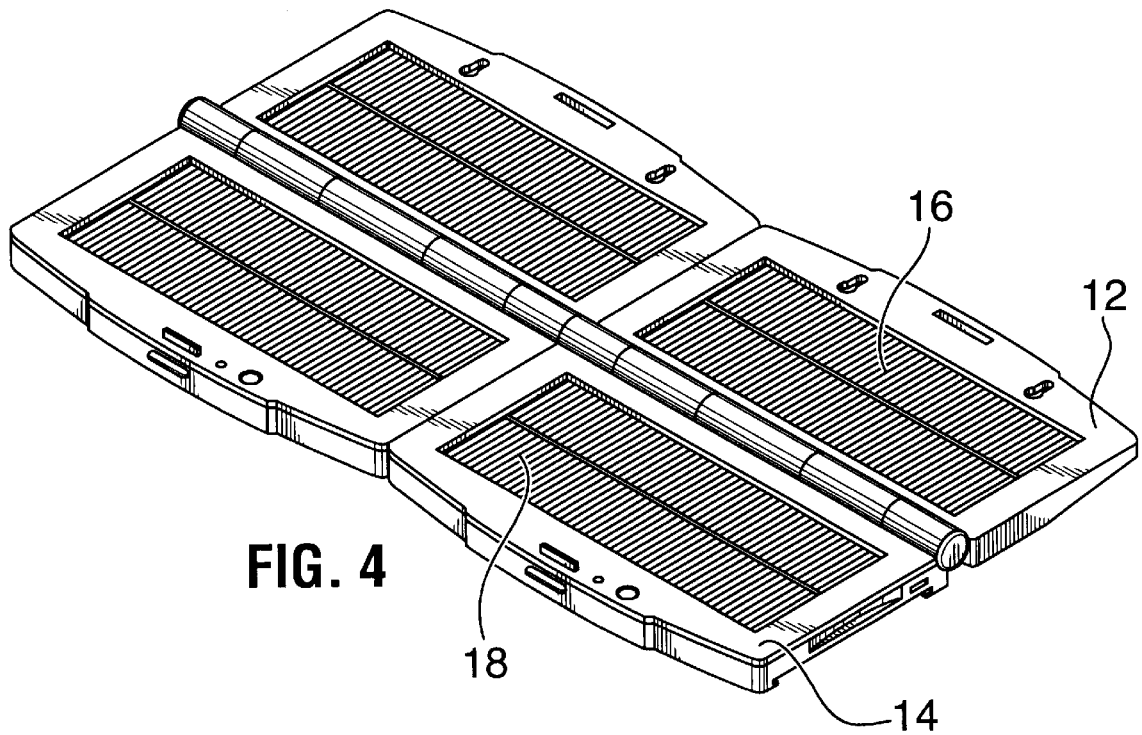
FIG. 4 is a perspective view of two units linked together.

The body members 12 and 14 are interconnected by a hinge, each body member 12 and 14 having mating sections 20 comprising the hinge. The hinge 20 includes opposed ends 22 and 24 each including either a male electrical contact 30 or a female electrical contact receptacle 34. It will be understood that each individual unit 10 includes one of the male connector 30 and the female connector 34. This has been found to be particularly useful for interconnection of similar modules so that the same can be ganged together to multiply the charging power of an interconnected unit, such is that shown in FIG. 4 relative to the single unit shown in FIG. 2.

Figure 3:
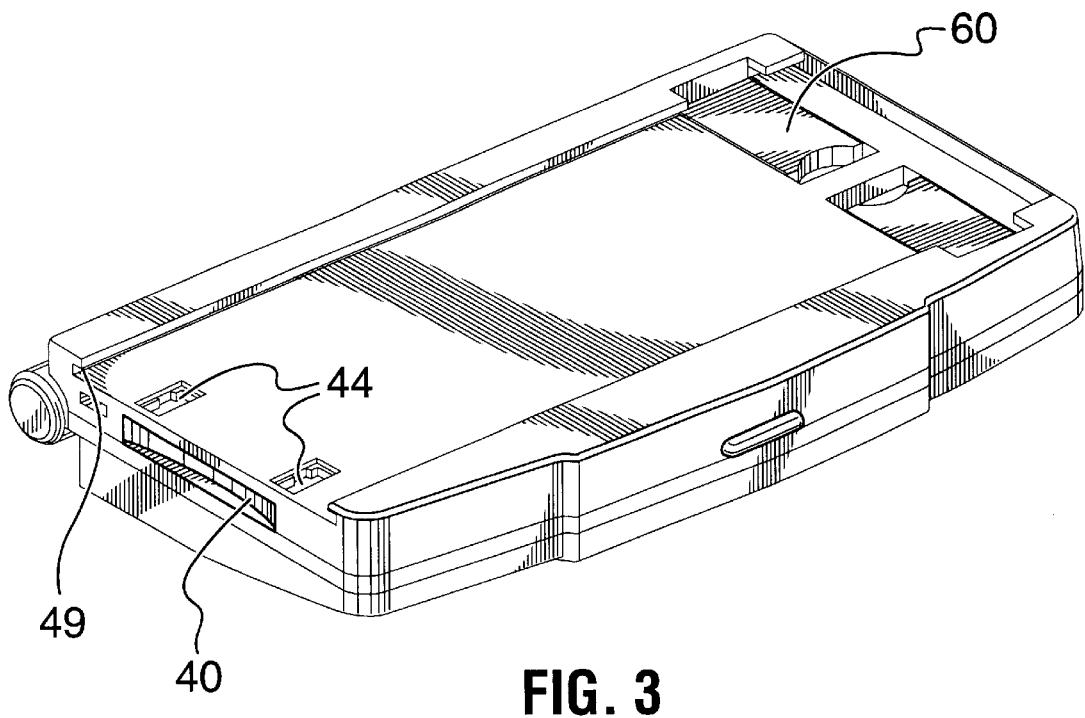
FIG. 3 is a view of the underside of the device.

In order to ensure positive contact and prevent any inadvertent disconnection of a ganged unit, each unit 10 further includes a retractable extension 40, shown best in FIG. 3 and which is adapted to extend outwardly from one of the body members 12 or 14. In the example, body member 14 includes the retractable projection 40 which retracts into and out of the body member 14. Extension and retraction is achieved by actuating slidable locks 44 which are molded into the under side of one of the body panels. Any suitable arrangement can be employed to retain the projection 40 in either its retracted position as shown in FIG. 3 or the extended position (not shown). Projection 40 cooperates and is received by a mating receptacle 48 extending within one of the body members 12 or 14. In this manner, the extension of projection 40 into receptacle or slot 48 achieves a physical connection between ganged units for added security and strength and therefore also alleviates any mechanical stress that would be placed on the electrical connection between interconnected units.

The underside of body member 14, shown in FIG. 3, also includes a peripheral channel 49 which has an open end adjacent projection 40. The channel 48 is associated with each edge of the body panel 14 as shown and is adapted to accommodate a substantially rectangular battery pack (see attached) therein. The battery pack may be charged from the energy received by solar arrays 16 and 18 with the energy being transferred to the battery pack (see attached) by two connection terminals on the underside of body member 14.

The underside of panel 14 also includes a pair of support legs 60 which are hingedly connected to the body for movement outwardly of the body such that they are substantially orthogonal relative to the body member 14 in a use position.

Figure 2:
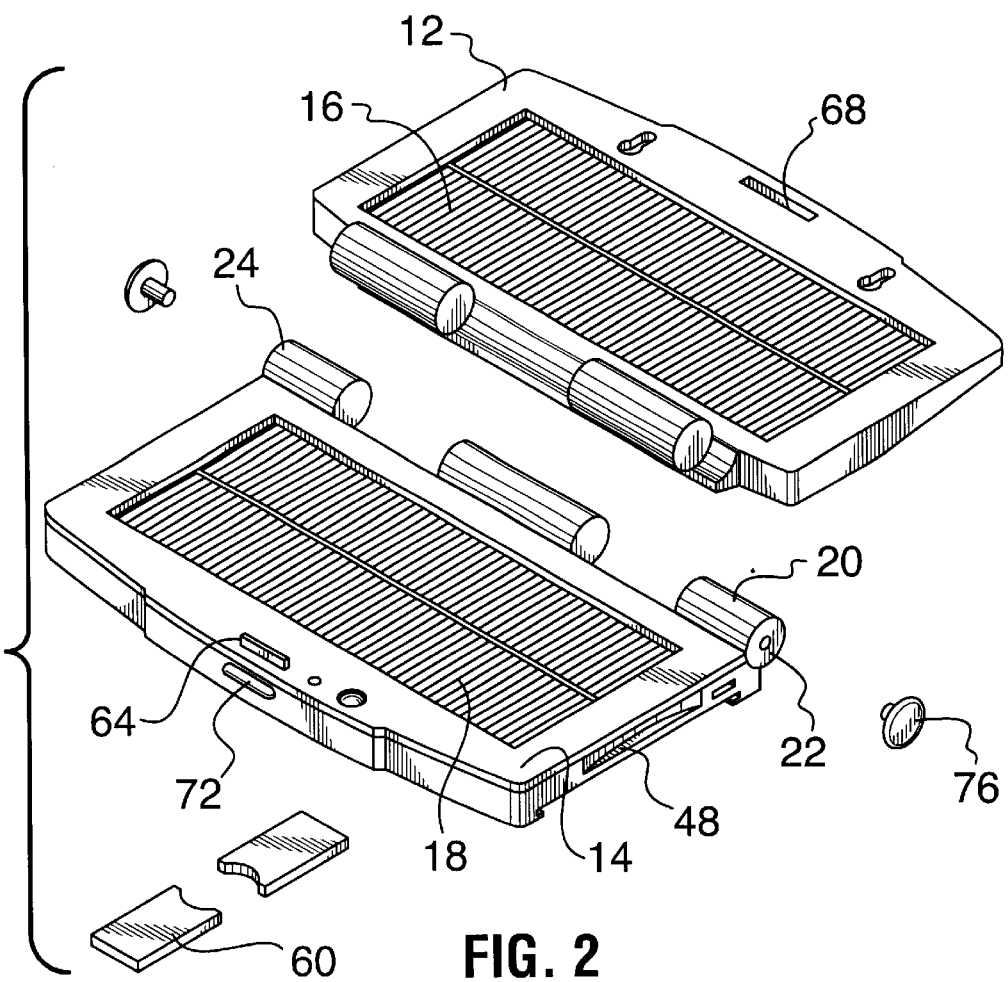
FIG. 2 is an exploded view of the device shown in FIG. 1.

When not in use, the body members can be moved from an open condition such as that shown in FIG. 2 to a closed position in overlying facing relation and retained in this position by a conventional lock mechanism. The male portion of the lock is denoted by numeral 64 in body member 14 and the female portion 68 is in body member 12 which receives member 64. A release button 72 is provided to disengage the connected portions 64 and 68.

As a protective mechanism, each end 22 and 24, when similar units are not connected will include protective covers 76 which prevent any debris from entering the contacts.

Figure 5:
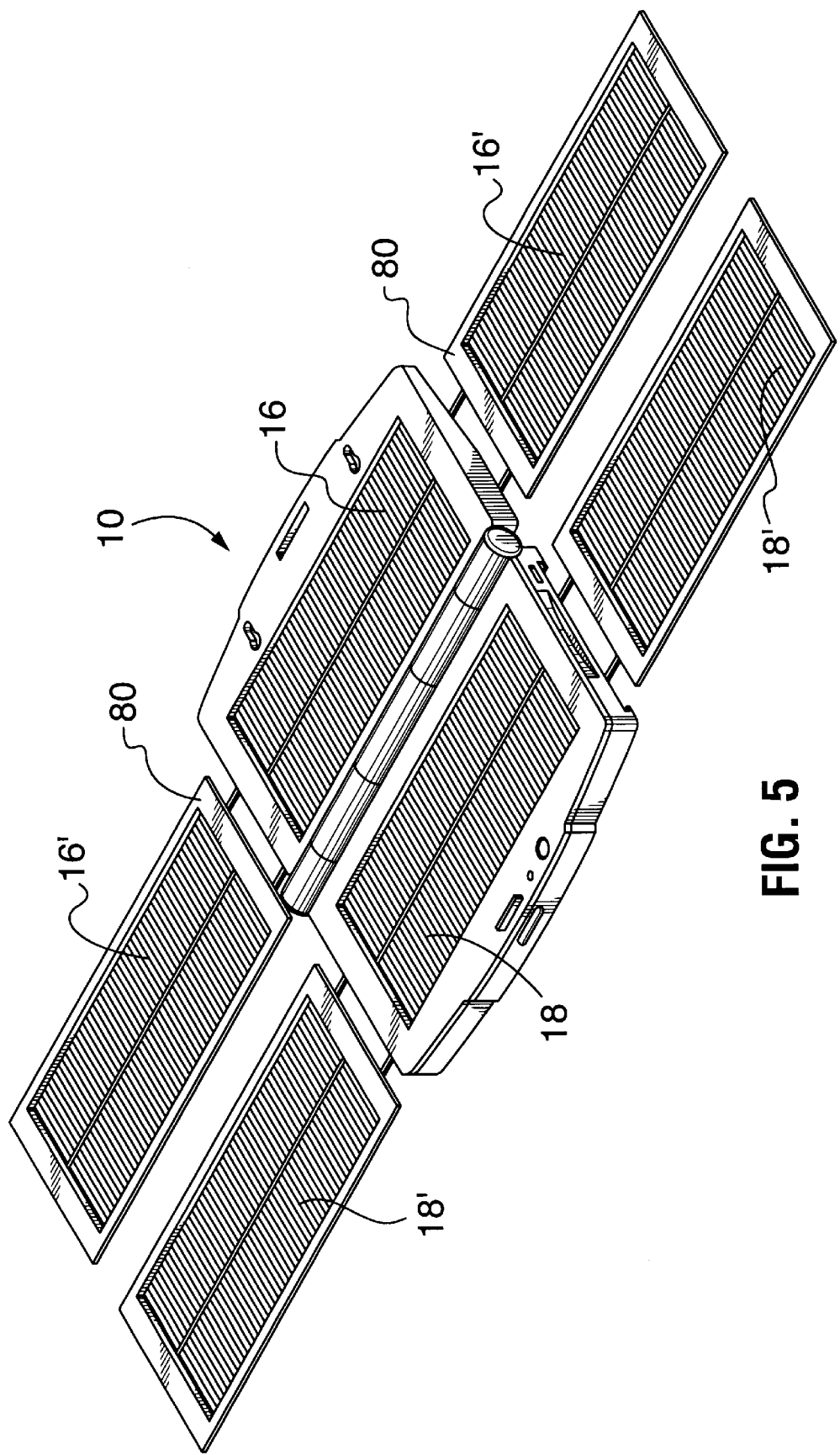
FIG. 5 is a perspective view of an alternate embodiment of the present invention.

Turning to FIG. 5, shown is a further embodiment of the present invention where additional solar arrays 16' and 18' are associated with the overall unit. The auxiliary solar arrays 16' and 18' are preferably hingedly connected by hinges 80 to a respective body panel. When not in use, the auxiliary panel 16' can simply be folded inwardly towards one another such that panel 16 and 16' are in a stacked facing relation as would also be the case with panels 18 and 18'. The unit can then be folded into a position shown in FIG. 1. The additional or auxiliary panels 16' and 18' can be incorporated where the voltage requirements to charge a battery are higher or the overall duty cycle of the arrangement is more strenuous.

With respect to the material of which the unit 10 may be made, the body members 12 and 14 are preferably constructed of non-electro magnetic materials which are also UV stabilized to prevent premature degradation inherent with solar exposure. Suitable materials include high impact polystyrene, composite materials, ceramics, etc.

With respect to the solar arrays, the individual choice of material will depend upon the voltage requirements of the battery and thus this parameter will be well appreciated by one skilled in the art.

It will be understood that any number of units can be ganged together.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A modular solar battery charger, comprising:
   a plurality of modules that include:
   a first body member and a second body member hingedly connected and moveable about a hinge axis from a storage position where each body member is positioned in overlying faced relation to a use position where each body member is in juxtaposed relation;
   a solar panel on each body member for generating electricity when exposed to light;
   a circuit means for transferring electrical energy from each said panel to a battery;
   module interconnection means for interconnecting at least two of said modules side-by-side as a unit with respective hinge axes generally parallel to one another and with said at least two of said modules in electrical contact to electrically connect respective solar panels of said at least two of said modules, wherein said interconnection means locks together body members of adjacent modules and reduces stress on the electrical contact between said modules.

2. The battery charger as set forth in claim 1, wherein said modular interconnection means comprises first cooperative engagement means and second cooperative engagement means, said second cooperative engagement means adapted for releasable cooperative engagement with said first cooperative engagement means of a similar module.

3. The battery charger as set forth in claim 2, wherein said first cooperative engagement means comprises a male electrical connection member.

4. The battery charger as set forth in claim 2, wherein said second cooperative engagement means comprises a female electrical connection member.

5. The battery charger as set forth in claim 2, wherein said module interconnection means includes third cooperative engagement means and fourth cooperative engagement means, said fourth cooperative engagement means adapted for releasable connection with said third cooperative engagement means of similar panel.

6. The battery charger as set forth in claim 5, wherein said third cooperative engagement means and said fourth cooperative engagement means physically link connected modules in a non-electrical manner.

7. The battery charger as set forth in claim 1, wherein said battery charger further includes support means for supporting at least one of said first body member and said second body member in an inclined attitude relative to horizontal.

8. A modular solar battery charger, comprising:
   a substantially rigid housing including a first substantially rigid body member and a second substantially rigid body member hingedly connected together and moveable about a hinge axis from a storage position where each body member is positioned in overlying faced relation to a use position where each body member is in juxtaposed relation;
   a solar panel fixedly mounted on each body member for generating electricity when exposed to light, wherein each said solar panel remains on a respective body member when in said use position and when in said storage position in which said solar panel is stored within said housing;
   a circuit arranged to transfer electrical energy from each said panel to a battery;
   at least one interconnector on at least one of said body members configured to fixedly interconnect similar battery chargers side-by-side as a unit with respective hinge axes generally parallel to one another and with said similar battery charges in electrical contact to connect solar panels of said similar battery chargers.

9. The battery charger as set forth in claim 8, wherein said at least one interconnector includes a first cooperative engagement member and a second cooperative engagement member mounted on at least one of said body members, said second cooperative engagement member adapted for releasable cooperative engagement with a similar first cooperative engagement member of a similar battery charger.

10. The battery charger as set forth in claim 8, wherein said first cooperative engagement member includes a male electrical connection member and said second cooperative engagement member includes a female electrical connection member.

11. The battery charger as set forth in claim 8, wherein at least one interconnector includes a third cooperative engagement member and a fourth cooperative engagement member, said fourth cooperative engagement member adapted for releaseable connection with a similar third cooperative engagement member of a similar panel.

12. The battery charger as set forth in claim 11, wherein said third cooperative engagement member and said fourth cooperative engagement member physically link connected battery charges in a non-electrical manner.

13. The battery charger as set forth in claim 8, wherein said battery charger further includes a support that supports at least one of said first body member and said second body member in an inclined attitude relative to horizontal.

14. The battery charger as set forth in claim 8, wherein said first substantially rigid body member and said second substantially rigid body member are connected via a hinge having overlapping mating sections on both the first and second body members, wherein an axis of rotation of said hinge extends through said mating sections on both said first and second body members.

15. The battery charger as set forth in claim 8, wherein said first and second body members are made with a strong synthetic material that protects the solar panels.

16. The battery charger as set forth in claim 14, wherein at least one of said at least one modular interconnector is located on a side of at least one of said first and second body member, which side extends generally perpendicular to said axis.

17. The battery charger as set forth in claim 8, wherein said body members are made from materials from the group consisting of high impact plastics, composite materials and ceramics.

18. A modular solar battery charger, comprising:

a first body member and a second body member hingedly connected and moveable from a storage position where each body member is positioned in overlying faced relation to a use position where each body member is in juxtaposed relation;

a solar panel on each body member for generating electricity when exposed to light;

a circuit means for transferring electrical energy from each said panel to a battery;

module interconnection means for interconnecting similar modules in electrical contact;

wherein said modular interconnection means comprises first cooperative engagement means and second cooperative engagement means, said second cooperative engagement means adapted for releasable cooperative engagement with said first cooperative engagement means of a similar module;

wherein said module interconnection means includes third cooperative engagement means and fourth cooperative engagement means, said fourth cooperative engagement means adapted for releasable connection with said third cooperative engagement means of similar panel; and wherein said third cooperative engagement means and said fourth cooperative engagement means physically link connected modules in a non-electrical manner.

19. A modular solar battery charger, comprising:

a first substantially rigid body member and a second substantially rigid body member hingedly connected together and moveable from a storage position where each body member is positioned in overlying faced relation to a use position where each body member is in juxtaposed relation;

a solar panel fixedly mounted on each body member for generating electricity when exposed to light, wherein each said solar panel remains on a respective body member when in said use position and when in said storage position;

a circuit arranged to transfer electrical energy from each said panel to a battery;

at least one interconnector on at least one of said body members configured to interconnect similar battery chargers in electrical contact;

wherein at least one interconnector includes a third cooperative engagement member and a fourth cooperative engagement member, said fourth cooperative engagement member adapted for releasable connection with a similar third cooperative engagement member of a similar panel;

wherein said third cooperative engagement member and said fourth cooperative engagement member physically link connected battery charges in a non-electrical manner.

20. The battery charger as set forth in claim 1, wherein said first body member and said second body member form at least part of a substantially rigid enclosure that encloses the solar panels in said storage position.

* * * * *